United States Patent
Simmonds et al.

(10) Patent No.: US 9,874,667 B2
(45) Date of Patent: Jan. 23, 2018

(54) WAVEGUIDES

(71) Applicant: BAE SYSTEMS plc, London (GB)

(72) Inventors: Michael David Simmonds, Rochester (GB); Anthony Robert Ferns, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/106,091

(22) PCT Filed: Dec. 12, 2014

(86) PCT No.: PCT/EP2014/077597
§ 371 (c)(1),
(2) Date: Jun. 17, 2016

(87) PCT Pub. No.: WO2015/091277
PCT Pub. Date: Jun. 25, 2015

(65) Prior Publication Data
US 2016/0320536 A1  Nov. 3, 2016

(30) Foreign Application Priority Data

Dec. 19, 2013 (EP) ..................................... 13275323
Dec. 19, 2013 (GB) .................................. 1322488.6

(51) Int. Cl.
 *G02B 6/34* (2006.01)
 *G02B 5/18* (2006.01)
 (Continued)

(52) U.S. Cl.
 CPC ......... *G02B 5/1823* (2013.01); *G02B 6/0016* (2013.01); *G02B 6/0035* (2013.01);
 (Continued)

(58) Field of Classification Search
None
See application file for complete search history.

(56) References Cited

U.S. PATENT DOCUMENTS

2016/0266343 A1* 9/2016 Weimann ............. G02B 6/4403
2016/0320536 A1* 11/2016 Simmonds ......... G02B 27/0081

FOREIGN PATENT DOCUMENTS

EP  2241926 A1  10/2010
GB  2495398 A   4/2013
(Continued)

OTHER PUBLICATIONS

International Search Report and Written Opinion received for Patent Application No. PCT/EP2014/077597, dated Feb. 3, 2015. 8 pages.
(Continued)

*Primary Examiner* — Tina Wong
(74) *Attorney, Agent, or Firm* — Finch & Maloney PLLC

(57) ABSTRACT

A waveguide for a display apparatus comprising a planar optical waveguide part (20) for guiding light to be displayed, an input diffraction grating (21) to diffract received light (7) along the optical waveguide part for guiding thereby, an intermediate diffraction grating (22) to receive diffracted light from the input diffraction grating and to expand the received light in a first dimension by diffraction (8), and an output diffraction grating (23) to receive the expanded light and to output the received expanded light (10) from the optical waveguide part by diffraction for display. The input diffraction grating is positioned so as to be located wholly within the geographical area of the intermediate grating, and the grating vectors of the input diffraction grating and the intermediate diffraction grating are oriented in different respective directions.

20 Claims, 13 Drawing Sheets

(51) Int. Cl.
  *G02B 27/00* (2006.01)
  *G02B 27/42* (2006.01)
  *F21V 8/00* (2006.01)
  *G02B 27/01* (2006.01)

(52) U.S. Cl.
  CPC ........... *G02B 6/34* (2013.01); *G02B 27/0081* (2013.01); *G02B 27/0172* (2013.01); *G02B 27/4272* (2013.01); *G02B 2027/0125* (2013.01)

(56) References Cited

FOREIGN PATENT DOCUMENTS

| GB | 2500631 A | 10/2013 |
|----|-----------|---------|
| WO | 03032017 A2 | 4/2003 |
| WO | 2009077772 A1 | 6/2009 |
| WO | 2010067116 A1 | 6/2010 |
| WO | 2013033274 A1 | 3/2013 |
| WO | 2015091277 A1 | 6/2015 |
| WO | 2015091282 A1 | 6/2015 |

OTHER PUBLICATIONS

International Search Report and Written Opinion received for Patent Application No. PCT/EP2014/077609 dated Feb. 2, 2015. 8 pages.
GB Intellectual Property Office Search Report under Section 17(5) received for GB Patent Application No. 1322488.6 dated May 29, 2014. 4 pages.
GB Intellectual Property Office Search and Examination Report under Sections 17 and 18(3) received for GB Patent Application No. 1422138.6 dated Mar. 20, 2015. 7 pages.
GB Intellectual Property Office Search Report under Section 17(5) received for GB Patent Application No. 1322490.2 dated May 29, 2014. 3 pages.
GB Intellectual Property Office Search and Examination Report under Sections 17 and 18(3) received for GB Patent Application No. 1422152.7 dated Mar. 20, 2015. 5 pages.
Extended European Search Report received for EP Patent Application No. 13275323.7 dated Mar. 7, 2014. 6 pages.
Extended European Search Report received for EP Patent Application No. 13275325.2 dated Mar. 7, 2014. 7 pages.
International Preliminary Report on Patentability received for Patent Application No. PCT/EP2014/077597, dated Jun. 30, 2016. 6 pages.
International Preliminary Report on Patentability received for Patent Application No. PCT/EP2014/077609 dated Jun. 30, 2016. 6 pages.

* cited by examiner

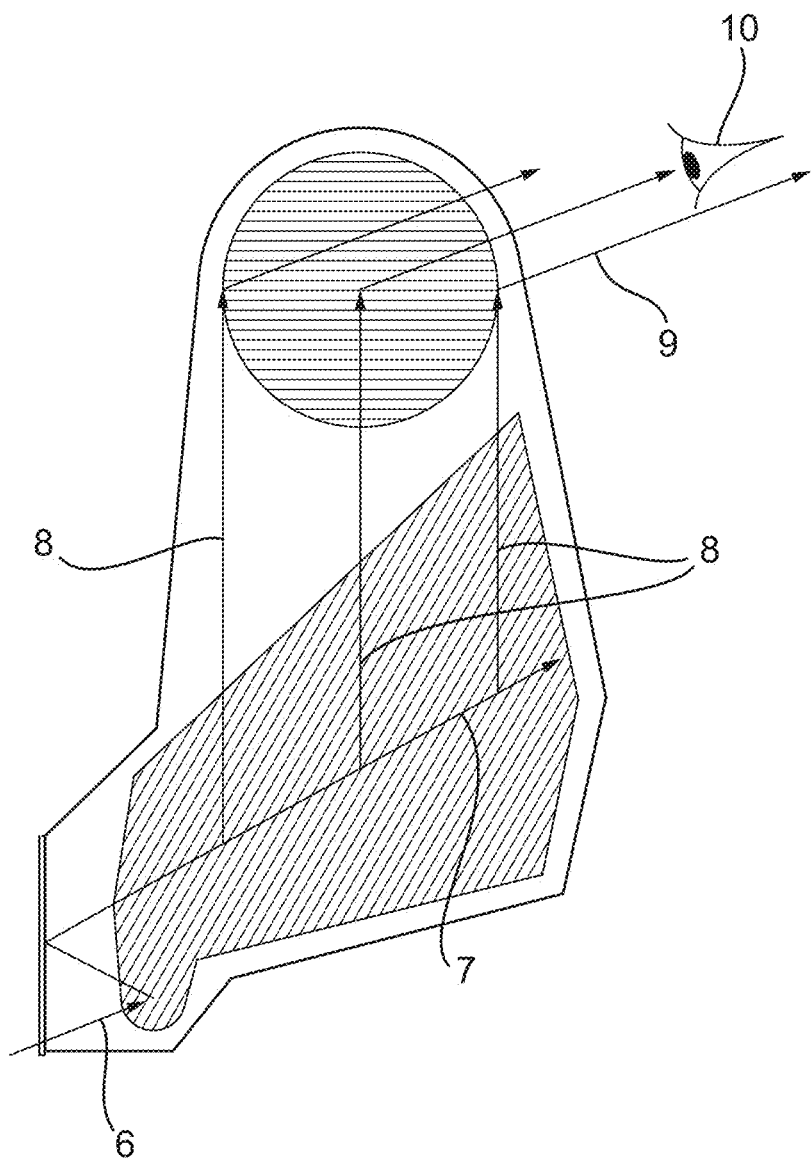

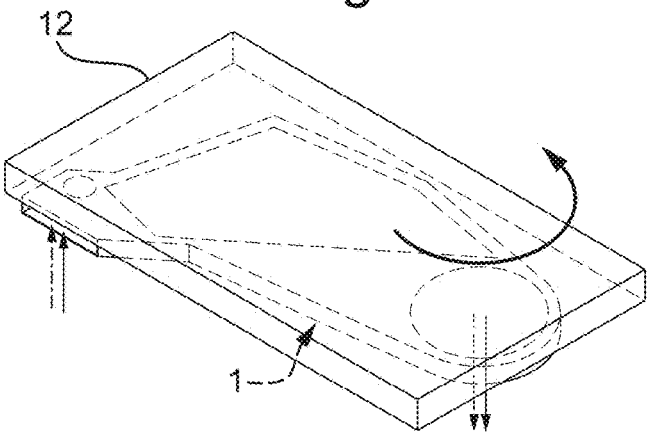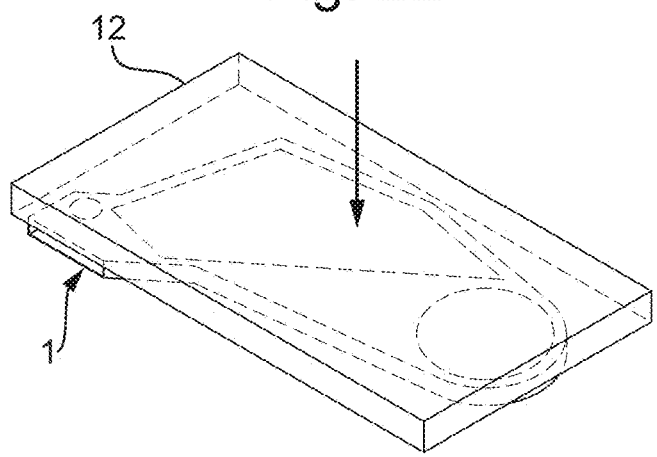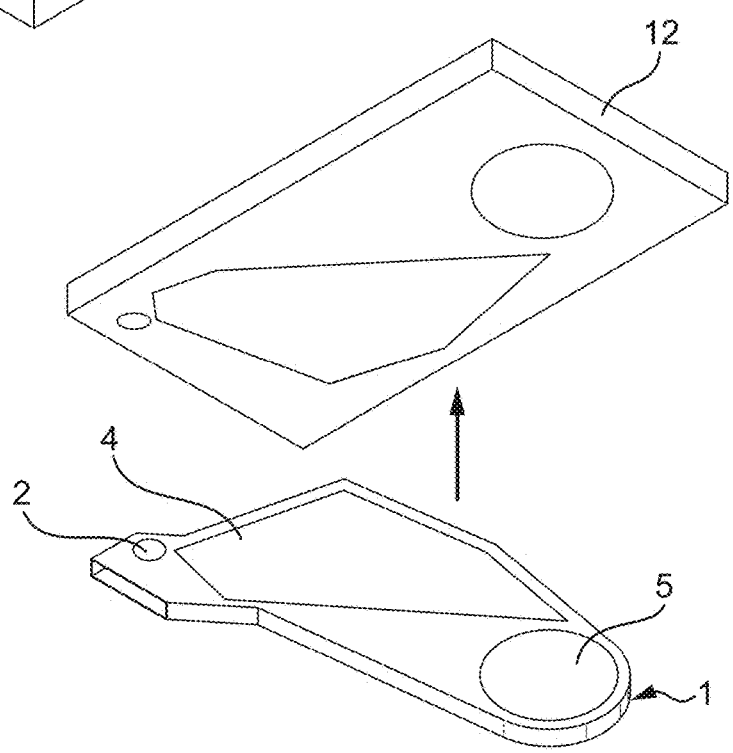

Fig. 10A
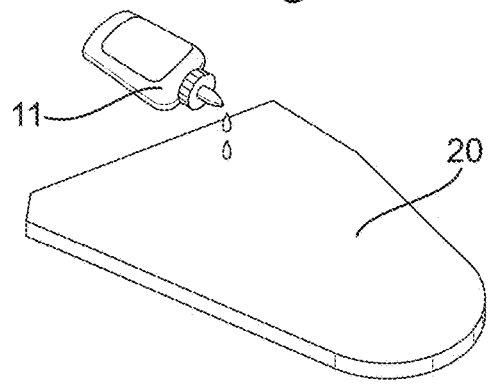
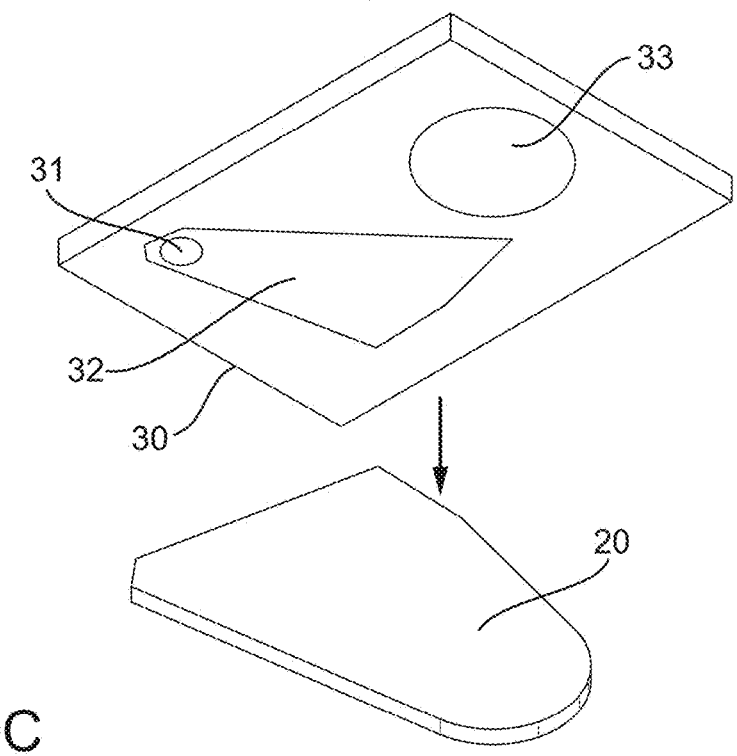
Fig. 10B
Fig. 10C
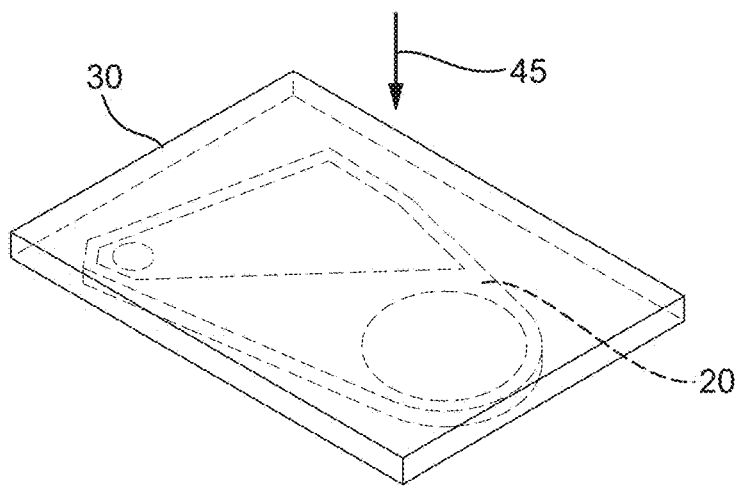

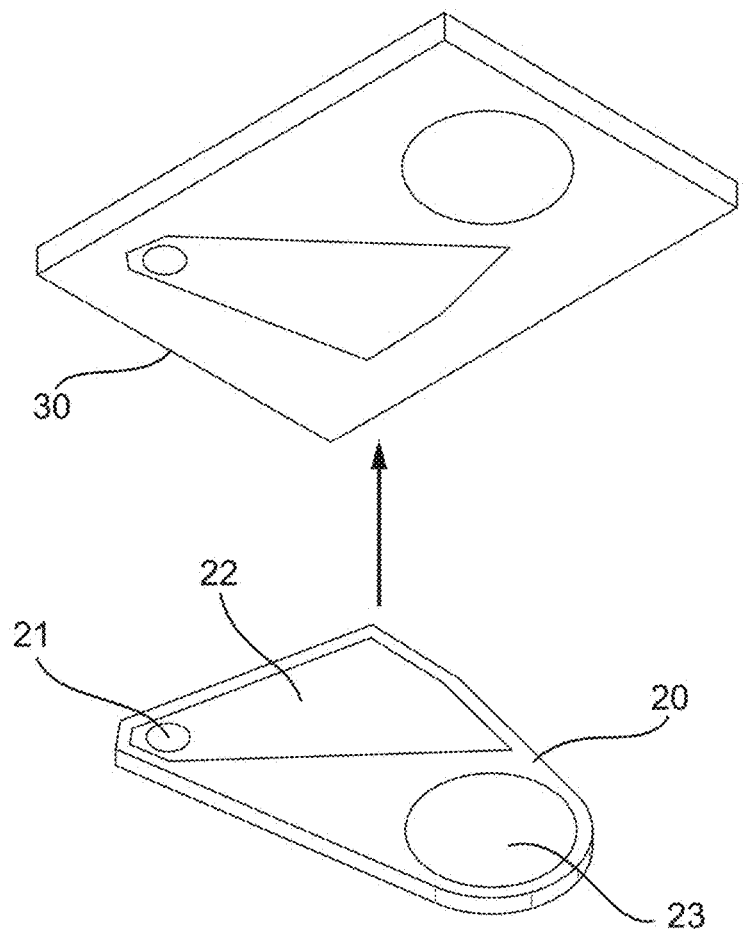

WAVEGUIDES

FIELD OF THE INVENTION

The invention relates to a waveguide such as, but without limitation to, an optical waveguide for displays, and to a display device. In particular, the invention is relevant to a display device in which image-bearing light is injected into a waveguide, is expanded to form a visible image and is released from the waveguide for viewing.

BACKGROUND

Prior art display devices of this type can comprise a slab waveguide containing three separate diffraction gratings arranged to perform a respective one of three successive functions. A first grating serves as a light input area for diffracting received light in a direction along the slab waveguide. A second grating serves to expand the light from the first grating in a first dimension, and a third grating serves to receive the expanded light and further expand the light in a second dimension orthogonal to the first dimension and to output the result from the waveguide. In order that the second diffraction grating is able to diffract received light in a direction required to enable that diffracted light to reach the third diffraction grating, it is also necessary that the light is received by the second grating from the first grating in an appropriate direction relative to the orientation of the grating lines of the second grating. A misalignment between the orientation of grating lines in the first (input) grating and the second grating will result in a misalignment of light output from the second grating relative to the orientation of the grating lines of the third (output) grating.

This has the overall effect of degrading the quality of the image reproducible from the image-bearing light output by the third (output) grating.

To try to reduce the possibility of misaligned grating lines between first and second diffraction gratings, some prior art methods include pressing or stamping both the first and second gratings as different parts of one general grating structure having one common orientation of grating lines throughout. This may be in the form of two separated grating areas stamped from a common single grating stamper (e.g. FIG. 1A) or in the form of two separate regions of one grating pattern stamped from one stamper (e.g. FIG. 1B).

However, in both cases, in order that the second grating or grating region may receive the input light from the first grating or grating region at an appropriate angle of direction of incidence to the grating lines of the second grating for onward diffraction to the third (output) grating, the light emanating from the first grating or grating region must be re-directed by being reflected back towards the second grating or grating region. A highly reflective surface must be provided along parts of an edge of the slab waveguide in order to achieve this.

The reflective surface must be manufactured to a very high optical standard if it is to be of use. Polishing of a reflective slab edge to a very flat surface is required. This is difficult to achieve and such waveguides are expensive to produce.

The present invention aims to address these matters.

SUMMARY OF THE INVENTION

In a first aspect, the invention provides a waveguide for a display apparatus comprising: a planar optical waveguide part for guiding light to be displayed; an input diffraction grating arranged to receive light and diffract the received light along the optical waveguide part for guiding thereby; an intermediate diffraction grating optically coupled to the input diffraction grating via the optical waveguide part and arranged to receive diffracted light from the input diffraction grating and to expand the received light in a first dimension by diffraction; an output diffraction grating optically coupled to the intermediate diffraction grating via the optical waveguide part and arranged to receive the expanded light and to output the received expanded light from the optical waveguide part by diffraction for display; wherein the input diffraction grating is positioned so as to be located wholly within the geographical area, or footprint, of the intermediate grating, and wherein the grating vectors of the input diffraction grating and the intermediate diffraction grating are oriented in different respective directions. For example, if the respective grating vectors do not lie substantially in the plane of the waveguide part, the projections of the grating vectors of the input diffraction grating and the intermediate diffraction grating onto the plane of the optical waveguide part may be oriented in different respective directions.

The input diffraction grating may be positioned substantially in-plane or coplanar with the intermediate diffraction grating such that the physical location of the input diffraction grating is wholly within the geographical area or footprint of the intermediate diffraction grating.

The input diffraction grating may be positioned adjacent to the intermediate diffraction grating (e.g. parallel to, but out-of-plane) such that the apparent location of the input diffraction grating is wholly within the geographical area or footprint of the intermediate diffraction grating. The location of the input diffraction grating as being wholly within the geographical area, or footprint, of the intermediate diffraction grating may be a physical/actual location or may be an apparent location. The apparent location of the input grating within that geographical area or footprint may be achieved by positioning the input grating suitably near to the intermediate diffraction grating such that a surface upon which the intermediate grating is formed, and which is enclosed by the outer bounds/periphery of the intermediate diffraction grating, extends wholly over the input grating, which is itself formed upon a separate surface. An example is to form the intermediate diffraction grating upon one planar surface of the optical waveguide part and to form the input diffraction grating upon the opposite planar surface of the waveguide part within the footprint of the intermediate grating as projected onto the latter planar surface (e.g. visible through the waveguide part).

Preferably, the material of the intermediate diffraction grating covers all of those parts of the surface of the optical waveguide part at one side thereof via which the received light is guided by total internal reflection from the input diffraction grating to the intermediate diffraction grating.

The material of the intermediate diffraction grating is preferably continuous with the material of at least the input diffraction grating.

The material of the intermediate diffraction grating may be continuous with the material of the output diffraction grating.

The intermediate diffraction grating may be a surface relief grating formed in a surface of the waveguide. The input diffraction grating and the output diffraction grating may each be a relief grating formed in a surface of the waveguide.

The intermediate diffraction grating may comprise a square-wave grating structure. The input grating or/and the output grating may comprise a blazed grating structure.

The waveguide may include a coating upon the intermediate diffraction grating. The coating may have a refractive index which differs from the refractive index of the material of the intermediate diffraction grating.

The waveguide may include a coating upon the input or/and the output diffraction grating, which may have a refractive index which differs from the refractive index of the material of the input or/and the output diffraction grating.

The output diffraction grating is preferably arranged to receive the expanded light from the intermediate diffraction grating and to expand the received light in a second dimension transverse to the first dimension.

The invention may provide a display device comprising the waveguide described above.

In a second aspect, the invention provides a method for manufacturing a waveguide for a display apparatus the waveguide including an input diffraction grating to receive light and diffract the received light along the waveguide, an intermediate diffraction grating to receive diffracted light from the input diffraction grating and to expand the received light in a first dimension by diffraction, and an output diffraction grating to receive and output the expanded light from the optical waveguide by diffraction, the method comprising: providing a planar optical waveguide part; depositing upon the optical waveguide part a fluid material curable to form an optically transparent solid; impressing upon the fluid material an impression defining an input diffraction grating region, an intermediate diffraction grating region and an output diffraction grating region wherein the fluid material of the intermediate diffraction grating region is continuous with the fluid material of at least the input diffraction grating region; curing the impressed fluid material to solidify the impression; wherein the input diffraction grating is positioned wholly within the geographical area, or footprint, of the intermediate grating, and wherein the grating vectors of the input diffraction grating and the intermediate diffraction grating are oriented in different respective directions. For example, if the respective grating vectors do not lie substantially in the plane of the waveguide part, the projections of the grating vectors of the input diffraction grating and the intermediate diffraction grating onto the plane of the optical waveguide part are preferably oriented in different respective directions.

The input diffraction grating may be positioned substantially in-plane or coplanar with the intermediate diffraction grating such that the physical location of the input diffraction grating is wholly within the geographical area or footprint of the intermediate diffraction grating.

Preferably, the cured material covers all of those parts of the surface of the optical waveguide part at one side thereof via which the received light is guided by total internal reflection from the input diffraction grating to the intermediate diffraction grating.

The impressing may include impressing upon the fluid material at the same one side of the planar waveguide both the input grating and the intermediate diffraction grating.

The impressing may include impressing upon the fluid material at the same one side of the planar waveguide both the input grating and the intermediate diffraction grating as a diffractive region surrounding the input grating.

The fluid material of the intermediate diffraction grating region may be continuous with the fluid material of the output diffraction grating region.

The impressing may include impressing upon the fluid material at the same one side of the planar waveguide each of the input grating, the intermediate diffraction and the output diffraction grating.

The impressing may include impressing upon the fluid material simultaneously each of the input grating, the intermediate diffraction and the output diffraction grating.

The curing may include curing the fluid material simultaneously for each of the input grating and the intermediate diffraction or additionally the output diffraction grating.

The impressing may include impressing the intermediate diffraction grating with a square-wave grating structure.

The impressing may include impressing the input grating or/and the output grating with a blazed grating structure.

The method may include applying a coating upon the intermediate diffraction grating having a refractive index which differs from the refractive index of the material of the intermediate diffraction grating.

The method may include applying a coating upon the input or/and the output diffraction grating having a refractive index which differs from the refractive index of the material of the input or/and the output diffraction grating.

The output diffraction grating is preferably arranged to receive the expanded light from the intermediate diffraction grating and to expand the received light in a second dimension transverse to the first dimension.

In a third aspect, the invention may provide a method for manufacturing a waveguide for a display apparatus the waveguide including an input diffraction grating to receive light and diffract the received light along the waveguide, an intermediate diffraction grating to receive diffracted light from the input diffraction grating and to expand the received light in a first dimension by diffraction, and an output diffraction grating to receive and output the expanded light from the optical waveguide by diffraction, the method comprising: providing a planar optical waveguide part; depositing upon opposite planar surfaces of the optical waveguide part a fluid material curable to form an optically transparent solid; impressing upon the fluid material an impression defining an input diffraction grating, an intermediate diffraction grating, and an output diffraction grating; curing the impressed fluid material to solidify the impressions; wherein the input diffraction grating is positioned adjacent to the intermediate grating so as to be located wholly within the geographical area, or footprint, of the intermediate grating, and wherein the grating vectors of the input diffraction grating and the intermediate diffraction grating are oriented in different respective directions. For example, if the respective grating vectors do not lie substantially in the plane of the waveguide part, the projections of the grating vectors of the input diffraction grating and the intermediate diffraction grating onto the plane of the optical waveguide part are preferably oriented in different respective directions.

The input diffraction grating may be positioned adjacent to the intermediate diffraction grating parallel to it, but out-of-plane from it, such that the apparent location of the input diffraction grating is wholly within the geographical area or footprint of the intermediate diffraction grating. The location of the input diffraction grating as being wholly within the geographical area, or footprint, of the intermediate diffraction grating may be an apparent location. The apparent location of the input grating within that geographical area or footprint may be achieved by positioning the input grating suitably near to the intermediate diffraction grating such that a surface upon which the intermediate grating is formed, and which is enclosed by the outer bounds/periphery of the intermediate diffraction grating, extends wholly over the input grating, which is itself formed upon a separate surface. An example is to form the intermediate diffraction grating upon one planar surface of the optical waveguide part and to form the input diffraction grating upon the opposite planar surface of the waveguide part within the footprint of the intermediate grating as projected onto the latter planar surface (e.g. visible through the waveguide part).

The fluid material is preferably deposited upon each of two opposite sides of the planar waveguide part, and the impressing preferably includes impressing upon the fluid material at one side of the planar waveguide the intermediate diffraction grating as a diffractive region surrounding a substantially non-diffractive input window region, and impressing upon the fluid material at the opposite side of the planar waveguide the input grating such that the input grating is visible through the input window region.

Preferably, the cured material covers all of those parts of the surface of the optical waveguide part at one side thereof via which the received light is guided by total internal reflection from the input diffraction grating to the intermediate diffraction grating.

The fluid material of the intermediate diffraction grating region may be continuous with the fluid material of the output diffraction grating region.

The impressing may include impressing upon the fluid material at the same one side of the planar waveguide each of the intermediate diffraction gating and the output diffraction grating.

The curing may include curing simultaneously the fluid material each of the intermediate diffraction grating and the output diffraction grating at the one side of the planar waveguide, and subsequently applying the fluid material at the opposite side of the planar waveguide.

The impressing may include subsequently impressing the input grating upon the fluid material at the opposite side of the planar waveguide.

The method may include adjusting the orientation of the input diffraction grating impressed into the fluid material relative to the solidified intermediate diffraction grating and solidified output diffraction grating, and subsequently curing the impressed input diffraction grating at a chosen orientation.

The impressing may include impressing the intermediate diffraction grating with a square-wave grating structure.

The impressing may include impressing the input grating or/and the output grating with a blazed grating structure.

The method may include applying a coating upon the intermediate diffraction grating having a refractive index which differs from the refractive index of the material of the intermediate diffraction grating.

The method may include applying a coating upon the input or/and the output diffraction grating having a refractive index which differs from the refractive index of the material of the input or/and the output diffraction grating.

The output diffraction grating is preferably arranged to receive the expanded light from the intermediate diffraction grating and to expand the received light in a second dimension transverse to the first dimension.

A periodic perturbation or variation of the refractive index of the waveguide part or surface corrugation upon it, may define a diffraction grating and this has the effect of changing the impulsion (wave vector surface component $\vec{k}_m$) of an incident light wave $\vec{k}_i$ along the grating surface by adding or subtracting an integer number (m) of grating impulses (grating vector $\vec{K}$):

$$\vec{k}_m = \vec{k}_i + m\vec{K}$$

where $$\vec{K} = \frac{2\pi}{d}\hat{d}$$

and d is the grating period in a unit-vector direction $\hat{d}$ which is in the plane of the grating and in the direction of periodicity of the grating (e.g. perpendicular to the direction of the straight grating lines/grooves).

If the grating lies in the xy-plane and the periodicity is along the x-axis, and the incident light ray lies in a plane perpendicular to the grooves, the equation in reflection takes the form of the so-called grating equation:

$$\sin\theta_m = \sin\theta_i + m\frac{\lambda}{d}$$

where $\lambda$ is the wavelength of light.

BRIEF DESCRIPTION OF THE DRAWINGS

Example embodiments of the present invention will now be described in more detail with reference to the accompanying drawings, of which:

FIGS. 1A and 1B each show a slab waveguide according to the prior art;

FIGS. 2A to 2F schematically illustrate a process for manufacturing a slab waveguide according to FIG. 1;

FIGS. 10A to 10D schematically illustrate a process for manufacturing a slab waveguide of the present invention according to FIG. 4.

DETAILED DESCRIPTION

Figure 1A:
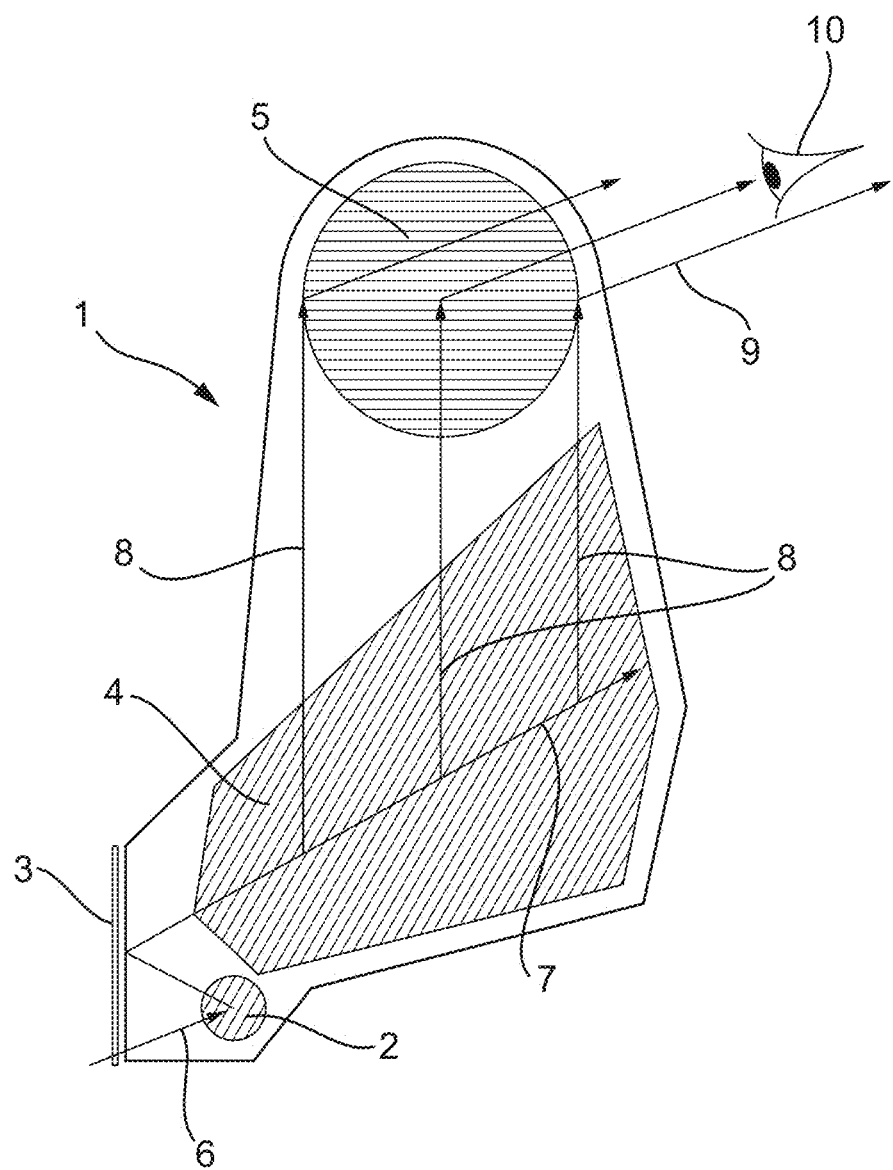
Figure 2A:
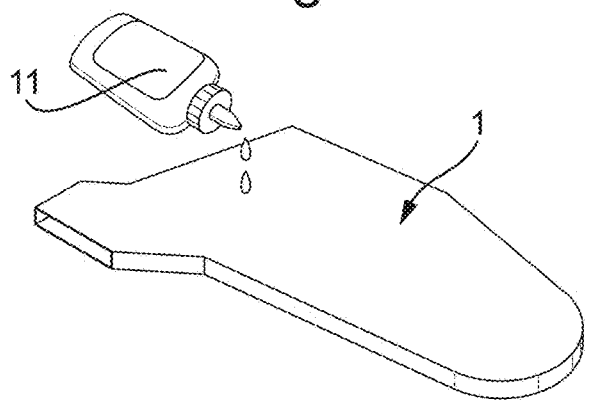
Figure 2B:
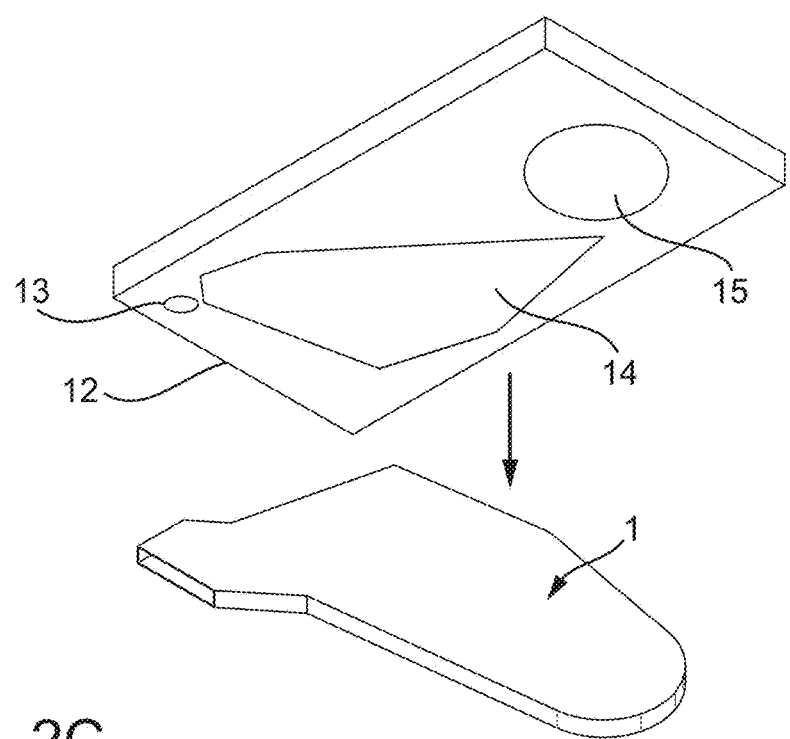
Figure 2C:
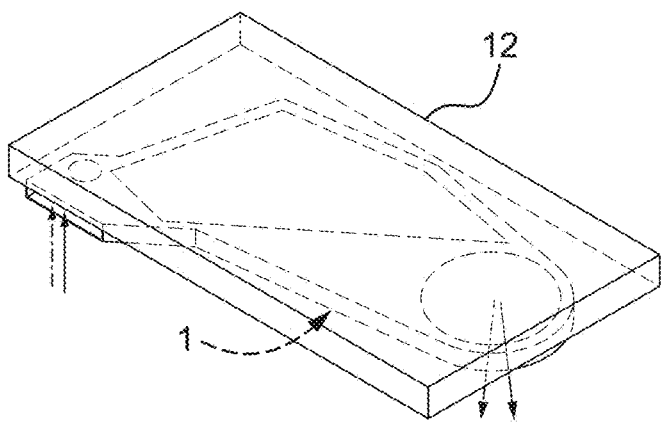

In the drawings like reference symbols refer to like items.

FIG. 1A shows a prior art waveguide for a display apparatus. The waveguide comprises a slab optical waveguide 1 for guiding light internally by total internal reflection between two opposing parallel and planar surfaces of the slab.

Image-bearing light to be displayed is input to the slab via an input diffraction grating 2 arranged to receive the image-bearing light 6 and to diffract the received light 7 along the slab optical waveguide for guiding across an intermediate diffraction grating 4 optically coupled to the input diffraction grating. The intermediate grating 4 is arranged to expand the received light in a first dimension 7 by diffraction and to direct the expanded light 8 towards an output diffraction grating 5 optically coupled to the intermediate diffraction grating via the slab optical waveguide.

The output grating is arranged to receive the expanded light 8 from the and to output 9 the received expanded light from the slab optical waveguide by diffraction for display to a user 10.

The input diffraction grating 2 is optically coupled to the intermediate diffraction grating via a reflective edge part of the slab waveguide which is coated by a reflective coating 3. Accordingly, input light 6 is diffracted towards the reflective edge and is guided to that reflective coating/edge 3 by total internal reflection within the slab waveguide. Upon reflection at the reflective edge, the guided input light is guided thereafter towards the intermediate diffraction grating 4.

The existence of the reflective edge complicated the manufacturing of the waveguide and makes the waveguide relatively expensive to make, difficult to manufacture and vulnerable to manufacturing errors once produced. FIG. 1B schematically illustrates a prior art variant of the prior art device of FIG. 1A in which the input diffraction grating 2 is structured as a contiguous grating region connected to the intermediate diffraction grating by being integrally formed with, and joined to, the intermediate grating region. The form and operation of the apparatus of FIG. 1B is otherwise identical to that of the apparatus of FIG. 1A, and light rays (6, 7, 8 and 9) are indicated in FIG. 1B to illustrate this.

It is to be noted that the grating lines of the input diffraction grating (FIG. 1A) or input diffraction grating region (FIG. 1B) are substantially parallel to the grating lines of the intermediate diffraction grating, or grating region (their grating vectors are identical), and so requires the use of a reflective edge 3 to redirect the input light 7 into the appropriate direction relative to the grating lines of the intermediate grating.

The commonly oriented grating lines (grating vectors) of the input and intermediate gratings (or grating regions) of both examples of prior art devices (FIGS. 1A and 1B) are produced by use of a single grating stamper bearing such commonly oriented grating lines/grooves in relief as is now described in relation to the apparatus of FIG. 1A. It is to be noted that this production method applies equally to the manufacture of the device of FIG. 1B. In both cases, the projection of the grating vectors of the input and intermediate grating parts onto the planar surface of the waveguide substrate are substantially parallel simply because those vectors are the same.

FIGS. 2A to 2F schematically illustrate the manufacturing process in question. The process begins (FIG. 2A) with the depositing upon a slab optical waveguide substrate 1 of a fluid curing glue 11 which is curable to form an optically transparent solid. Three separate, discrete and isolated deposits of curing glue are deposited upon the substrate at locations where it is intended to form three separate diffraction grating regions coupled optically to each other by the waveguide substrate. Next, (FIG. 2B) a grating stamper 12 is introduced to the process. The grating stamper bears upon one surface three surface relief patters (13, 14, 15) each one of which represents a respective one of three separate surface relief diffraction gratings. Each surface relief pattern of the grating stamper is in negative, or reciprocal, form to the grating it is designed to stamp. The relief of grating lines 13 for the input grating are substantially parallel to the relief pattern of grating lines 14 for the intermediate grating.

The grating stamper is impressed upon the three discrete deposits of fluid curing glue, in unison, to form an impression upon those three deposits corresponding to a respective one of three separate and discrete diffraction gratings. The three diffraction gratings define an input diffraction grating region defined by a first surface relief pattern 13 of the grating stamper, an intermediate diffraction grating region defined by a second surface relief pattern 14 of the grating stamper and an output diffraction grating region defined by a third surface relief pattern 15 of the grating stamper.

Of course, as mentioned above, the same basic process is applied in manufacturing the apparatus of FIG. 1B with the modification that the grating stamper comprises two separate surface relief patterns in which one pattern corresponds to the combined input and intermediate grating structure and the other corresponds to the output grating structure. Also, only two discrete deposits of fluid curing glue are required—one for the combined gratings and one for the output grating.

In the next manufacturing step (FIG. 2C), with the curing glue 11 still in fluid form and the grating stamper impressed upon it to define the three gratings there, light of multiple different colours is input into the curing glue deposit which is impressed with first surface relief (input) diffraction grating pattern. This input light is diffracted by the input grating pattern into the waveguide substrate 1 towards the reflective edge 3 (see FIG. 1) part of the waveguide substrate and thence to the intermediate diffraction grating pattern formed in the second deposit of fluid curing glue by the second surface relief pattern 14 and thence to the third (output) diffraction grating pattern impressed upon the third deposit of fluid curing glue by the third surface relief pattern 15 of the grating stamper 12. At the third (output) grating pattern, the multi-coloured light is output from the waveguide substrate 1. Any angular misalignment between the directions of output of the light of different colours is observed. Such a misalignment would be due to a misalignment between the reflective edge 3 of the waveguide substrate and the input diffraction grating pattern impressed by the first surface relief grating pattern 13 of the grating stamper and the intermediate diffraction grating pattern 14 impressed by the grating stamper since the grating grooves of those two patterns are substantially parallel. In effect, the angle of incidence of input light from the former must be accurately aligned such that light is coupled to the subsequent diffraction gratings optimally.

In order to adjust for such misalignment, the next manufacturing step (FIG. 2D) requires careful rotation of the grating stamper relative to the waveguide substrate (and its reflective edge 3) to re-align the fluid diffraction grating impressions within the curing glue deposits. Optimal alignment is detected when angular alignment if the different colours of output light beams is observed.

When optimal alignment is observed, the fluid curing glue is subsequently cured (FIG. 2E) by irradiating it with ultraviolet (UV) radiation. This solidifies the impressed fluid curing glue to solidify the input, intermediate and output diffraction grating impressions.

The resulting waveguide 1 is parted from the waveguide stamper 12 (FIG. 2F) and includes in surface relief an input diffraction grating 2 to receive light and diffract the received light along the waveguide towards the reflective edge 3, an intermediate diffraction grating 4 to receive diffracted light from the reflective edge 3 and to expand the received light in a first dimension by diffraction, and an output diffraction grating 5 to receive and output the expanded light from the optical waveguide by diffraction.

This prior art manufacturing process is time-consuming, difficult and prone to errors.

Two embodiments of the invention each provide a waveguide for a display apparatus which address these problems of manufacture and product.

Figure 3:
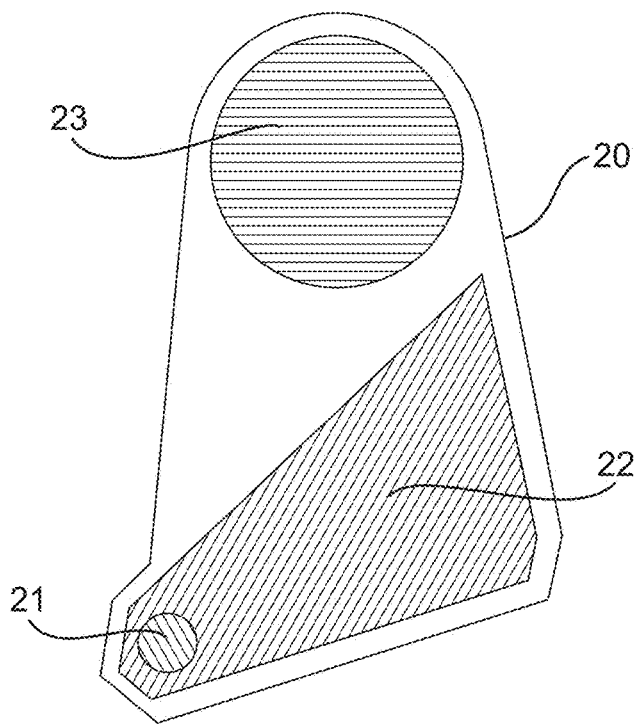
FIG. 3 shows a slab waveguide according to an embodiment of the invention.
Figure 4:
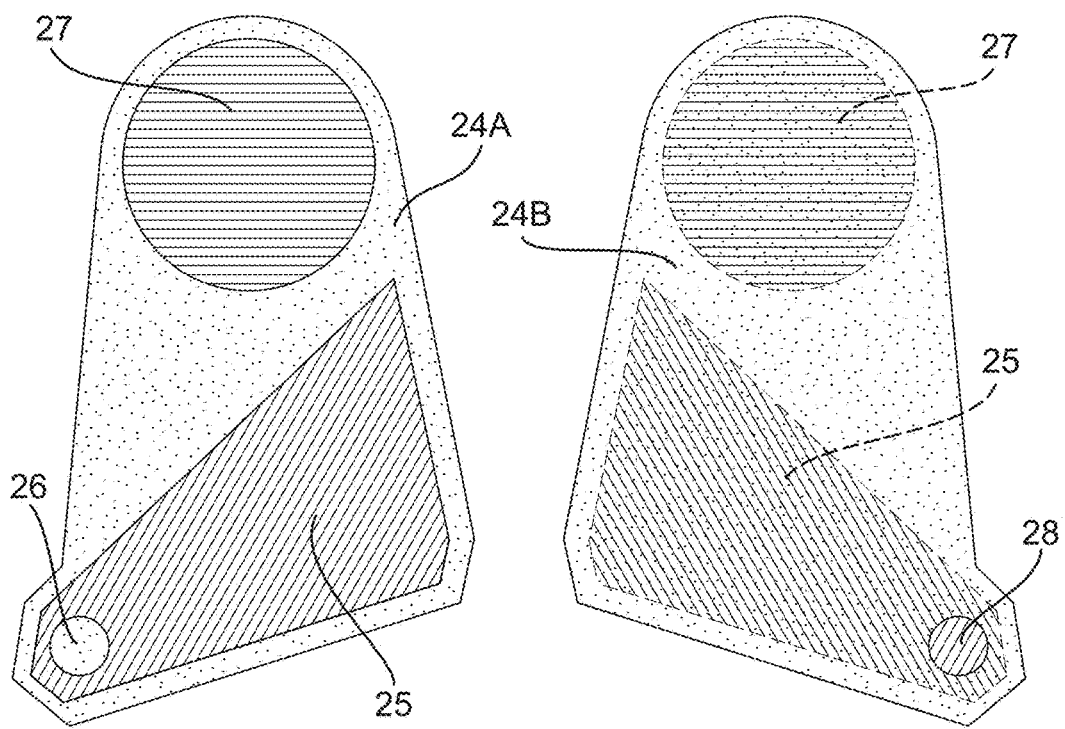
FIG. 4 shows both of two opposite planar sides of a slab waveguide according to another embodiment of the invention.

Referring to FIG. 3 and FIG. 4, the embodiments each comprise a slab optical waveguide substrate (20, 24) for guiding light to be displayed. The substrate bears an input diffraction grating (21, 28) arranged upon a surface to receive image-bearing light and diffract the received light along the optical waveguide directly towards an intermediate grating 25 so that the light is guided within the waveguide.

An intermediate diffraction grating (22, 25) is formed on a surface of the waveguide and is optically coupled to the input diffraction grating (20, 24) via the optical waveguide. It is arranged to receive diffracted light from the input diffraction grating directly and to expand the received light in a first dimension by diffraction. The grating lines/grooves of the input grating are not parallel to those of the intermediate grating such that the grating vectors of the two gratings have different orientations, as do their respective projections onto the planar surface of the waveguide substrate. In this example, the grating vectors lie parallel to the plane of the waveguide structure and, as such, their respective projections thereupon are equal to the vectors themselves. The input grating is located within the geographical area, or footprint, of the intermediate grating. By being located within the geographical area/footprint of the intermediate grating, it is meant that the actual location of the input grating may be defined as within the bounds of the intermediate grating (e.g. FIG. 3) or that the apparent location of the input grating may be defined as within the bounds of the intermediate grating (e.g. FIG. 4).

An output diffraction grating (23, 27) is optically coupled to the intermediate diffraction grating via the optical waveguide part and is arranged to receive the expanded light and to output the received expanded light from the optical waveguide, by diffraction, for display.

Notably, there is no use of a specially reflective edge as in the prior art device, and also the material of the intermediate diffraction grating (22, 25) covers all of those parts of the surface of the optical waveguide part, at one side of the waveguide slab, via which the input image-bearing light is guided by total internal reflection from the input diffraction grating (21, 28) to the intermediate diffraction grating (22, 25).

In the embodiment of FIG. 3, the material of the intermediate diffraction grating 22 is continuous with the material of the input diffraction grating 21. However, in the embodiment of FIG. 4, the material of the input diffraction grating 28 is not continuous with the material of the intermediate grating 25. Indeed, the intermediate grating 25 and the output grating 27 of this alternative embodiment are each formed on a first planar side 24A of the slab waveguide substrate opposite to the second planar side 24B of the slab waveguide substrate upon which the input grating 28 is formed. FIG. 4 shows both the first and second slab sides bearing these three diffraction gratings (dashed arrows point to gratings seen "through" the waveguide slab).

Referring to FIG. 4 in detail, the intermediate diffraction grating on one side 24A of the waveguide substrate comprises a diffractive region 25 surrounding a circular and substantially non-diffractive input window region 26. The opposite side 24B of the planar waveguide substrate bears the input grating 28 positioned in register with the input window region 26 such that the input grating is visible through the input window region. The input window region may comprise the same material of, and be continuous with, the material of the surrounding diffractive region 25 forming the intermediate diffraction grating. In alternative embodiments, the input window region may be defined by the absence of material leaving bare and exposed a region of the slab waveguide substrate exposed and un-covered/coated. In either case, the apparent location of the input diffraction grating 28, apparent through the input window 26, is within the bounds of the intermediate grating and as such is located within the geographical area or footprint of the intermediate grating. Of course, in the example of FIG. 3, the actual location of the input diffraction grating 21 is within the bounds of the intermediate grating. In the former case, the input grating is out-of-plane with the intermediate grating, and in the latter case it is in-plane.

The material of the intermediate diffraction grating (22, 25) may also be continuous with the material of the output diffraction grating (23, 27) in one or each of these embodiments. The output diffraction grating may be formed in-plane with the intermediate grating and/or the input grating or out-of-plane with either/both. This may be achieved by forming the output grating on an appropriate one of the two opposite surfaces of the waveguide substrate.

The intermediate diffraction grating (22, 25) is a square-wave surface relief grating formed in a surface of cured curing glue deposited upon a surface of the slab waveguide substrate (20, 24). Similarly, both the input diffraction grating (21, 28) and the output diffraction grating (23, 27) are each a blazed surface relief grating formed in a surface of cured curing glue deposited on a surface of the slab waveguide substrate.

A dielectric or metallic coating may be deposited upon the input, intermediate and/or output diffraction gratings as desired. The coating preferably has a refractive index which differs from (e.g. is greater than) the refractive index of the material of the cured curing glue forming the coated diffraction grating in question.

These embodiments of a waveguide are for use in a display device comprising the waveguide described above. Examples include a helmet-mounted head-up display (HUD), or a HUD for mounting in a vehicle (e.g. cock-pit, cabin etc. of a tactical vehicle or other vehicle).

Figure 5:
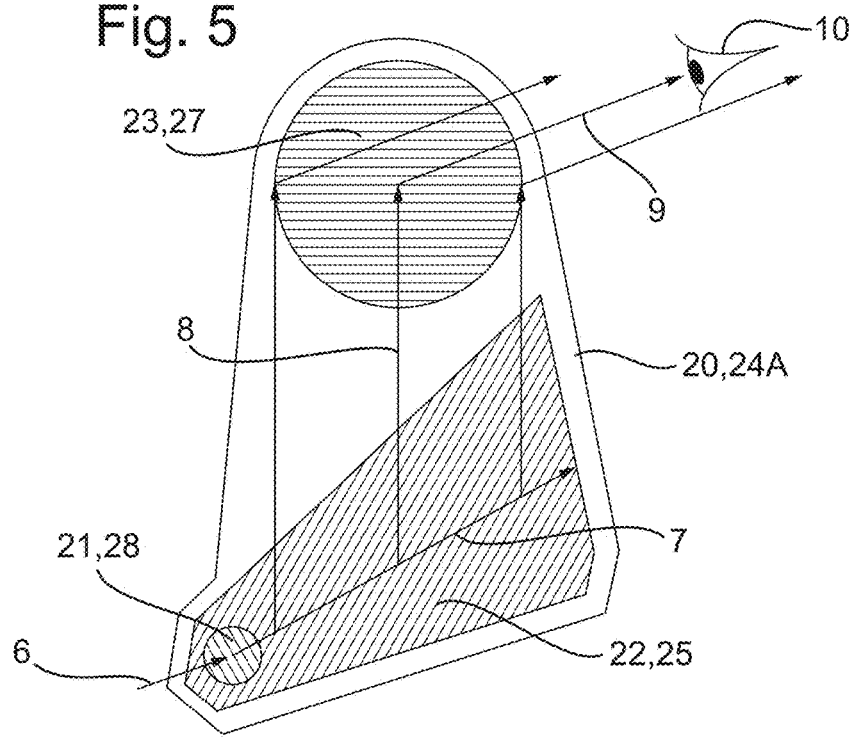
FIG. 5 schematically shows the interaction of light input to the slab waveguide according to an embodiment of the invention, and output thereby.

FIG. 5 schematically shows the waveguide of either of the embodiments of FIG. 3 or FIG. 4, in use. Image-bearing light 6 to be displayed is input to the slab waveguide (20, 24A) at the input diffraction grating (21, 28), whereupon it is diffracted and guided 7 along the slab optical waveguide directly towards and across the intermediate diffraction grating (22, 25) by virtue of the non-parallel selected orientation of its grating lines/grooves (or grating vector) relative to the grating lines/grooves (or grating vector) of the intermediate grating. The intermediate grating is arranged to expand the received light in a first dimension 7 by diffraction and to direct the expanded light 8, by virtue of the orientation of its grating lines/grooves (or grating vector) towards the output diffraction grating (23, 27) via the slab optical waveguide, for output 9, and viewing by a user 10.

In particular, the output grating is arranged to receive the expanded light 8 from the intermediate grating (22, 25) and to output 9 the received expanded light from the slab optical waveguide by diffraction for display. The orientation of the grating lines/grooves (i.e. grating vector) of the output grating differs from that of the grating lines/grooves (grating vector) of the intermediate grating.

FIG. 5 shows the input diffraction grating located within the intermediate diffraction grating and formed in common with differently-oriented grating lines/grooves/vector (as in FIG. 3) or formed separately but visible through the input window region of the waveguide (as in FIG. 4) as appropriate to the embodiment concerned.

FIGS. 6, 7, 8 and 9 illustrated advantageous aspects of the invention as compared to prior art waveguides such as illustrated in FIG. 1A or 1B.

Figure 6:
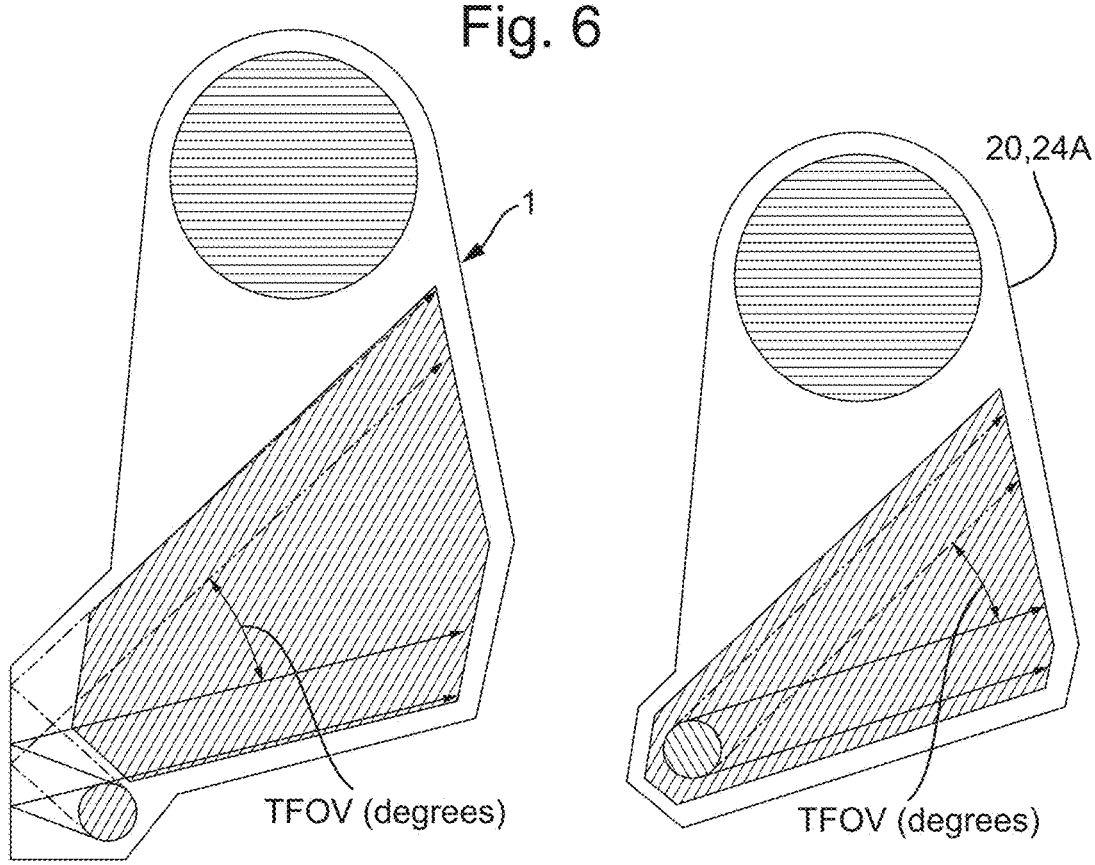
FIG. 6 schematically shows a comparison between the guiding of input light in the prior art slab waveguide of FIG. 1 and the slab waveguide according to the embodiments of the invention shown in FIG. 4 and FIG. 5.

Referring to FIG. 6, it can be seen that the avoidance of the use, in embodiments of the invention, of the need for a reflective edge 3 in the waveguide substrate shortens the optical path length of light passing from the input grating to the intermediate grating. Consequently, total angular field of view (TFOV) supported by the input diffraction grating can be accommodated by an intermediate diffraction grating having a relatively smaller width in embodiments of the invention. This enables the waveguide to be shorter as a whole since the intermediate diffraction grating may be smaller in area.

Figure 7:
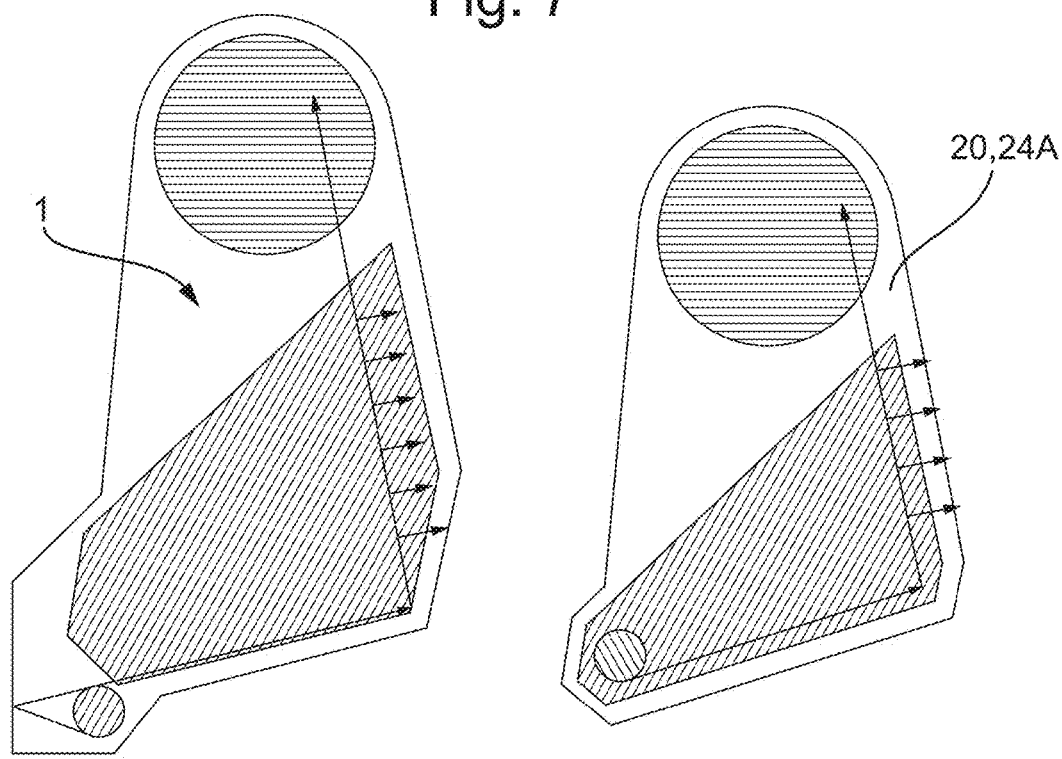
FIG. 7 schematically shows a further comparison between the guiding of input light in the prior art slab waveguide of FIG. 1 and the slab waveguide according to the embodiments of the invention shown in FIG. 4 and FIG. 5.

Furthermore, with reference to FIG. 7, this reduction in width/area of the intermediate grating means that light which has been diffracted by the intermediate diffraction grating in a direction towards the output grating (i.e. "turned" towards the output grating) is required to pass along less area of intermediate diffraction grating in its path towards the output grating. It must be noted that as the turned light is guided by total internal reflection (TIR) between opposing flat surfaces of the slab waveguide substrate, each TIR from the substrate surface bearing the intermediate grating structure will result in some loss of light by diffraction there. The lost light is directed transversely to the direction in which the "turned" light is travelling—i.e. away from the output grating. This light will not reach the output grating. The fewer of such lossy interactions there are with the intermediate grating the less light is lost from the final display output. Thus, the reduced area of the intermediate grating of the invention reduces such losses, as shown schematically in FIG. 7 in comparison with the more lossy prior art waveguide 1.

Figure 8:
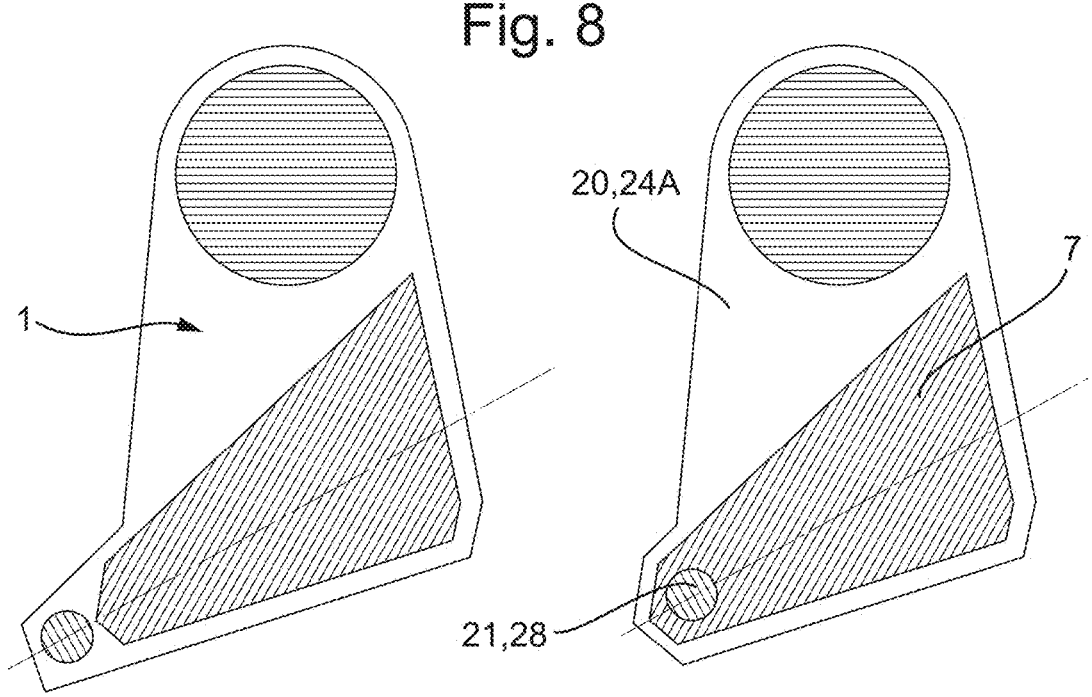
FIGS. 8 and 9 schematically show a comparison between the guiding of input light in the prior art slab waveguide of FIG. 1 and the slab waveguide according to the embodiments of the invention shown in FIG. 4.
Figure 8:
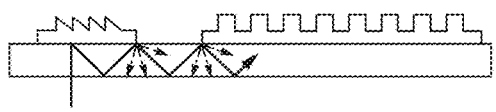
Figure 8:
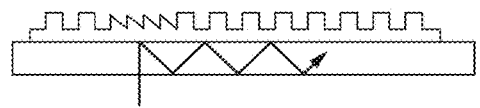
Figure 9:
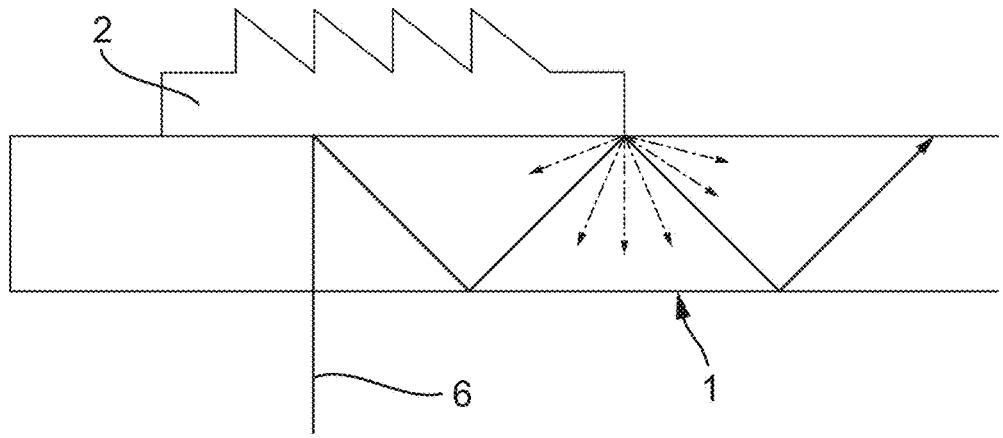
Figure 9:
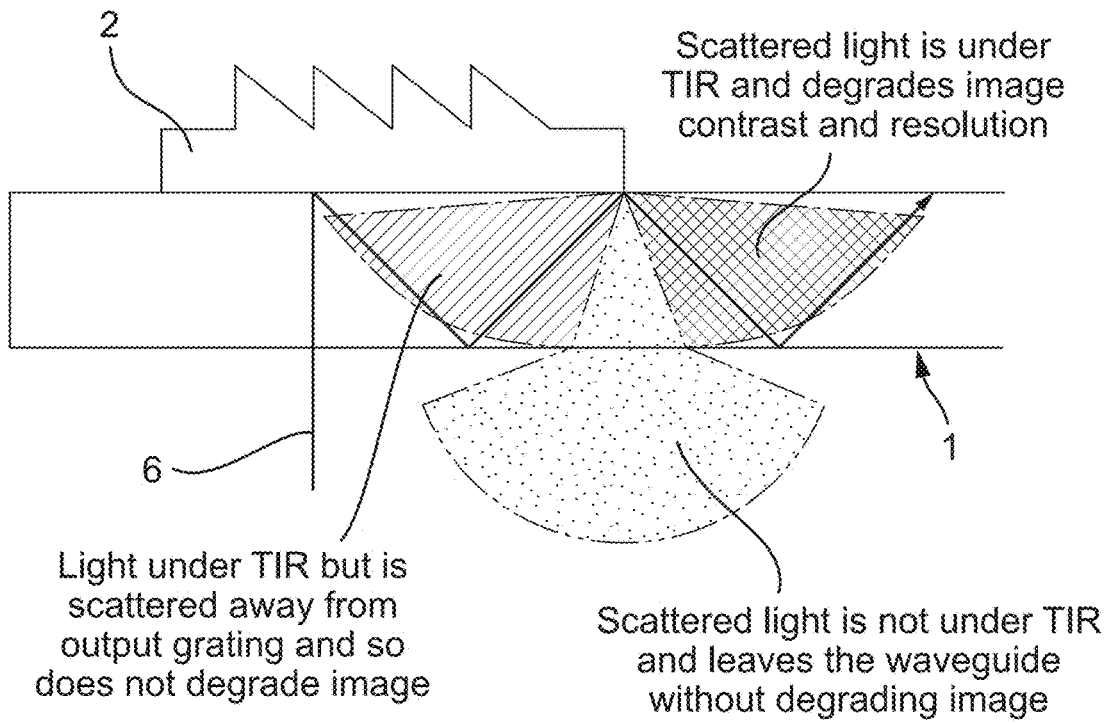
Figure 11A:
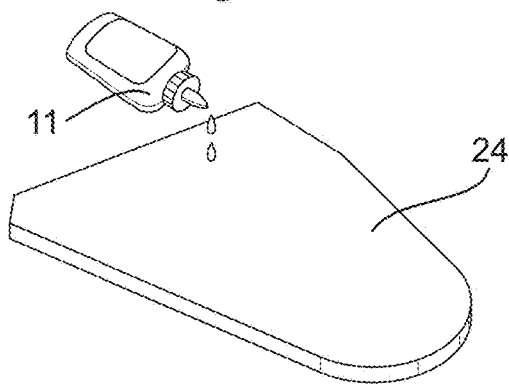
FIGS. 11A to 11I schematically illustrate a process for manufacturing a slab waveguide of the present invention according to FIG. 5.
Figure 11B:
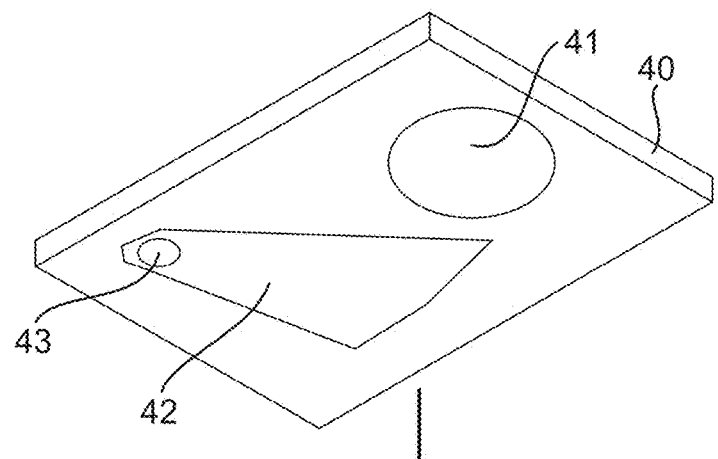
Figure 11C:
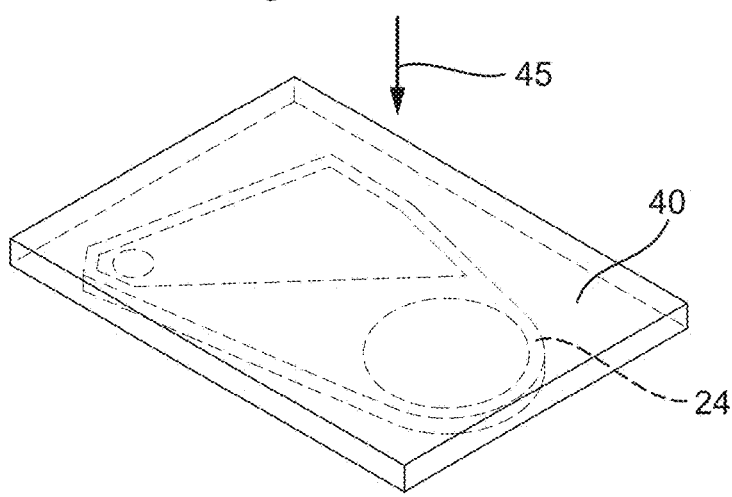
Figure 11D:
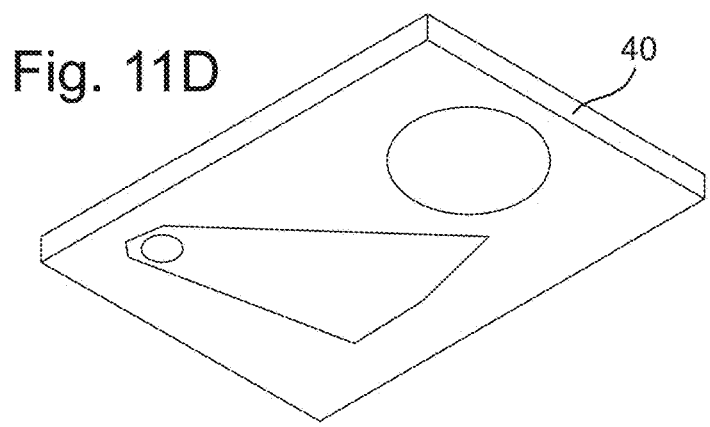
Figure 11E:
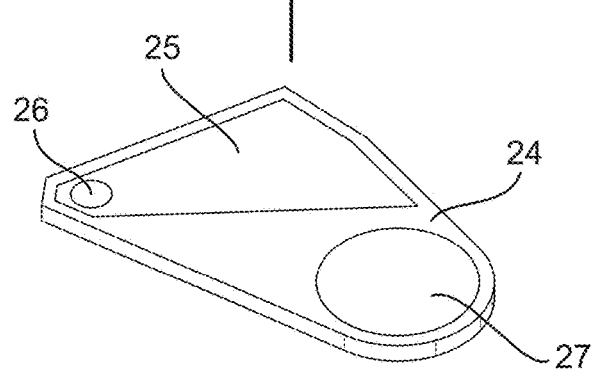
Figure 11F:
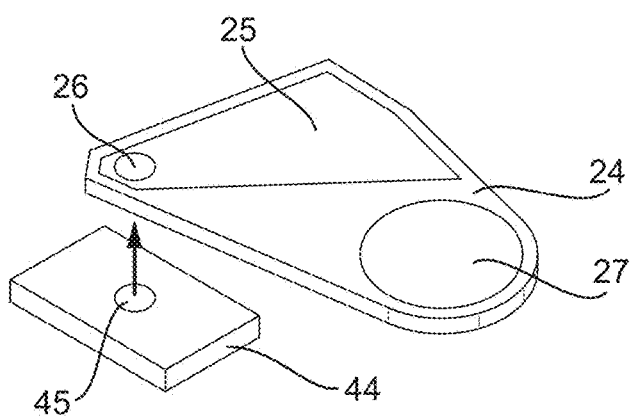
Figure 11F:
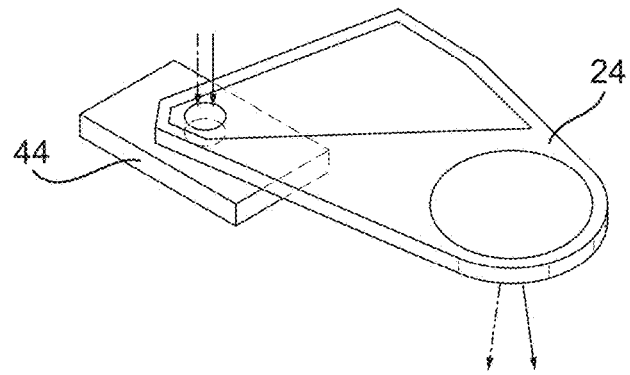
Figure 11G:
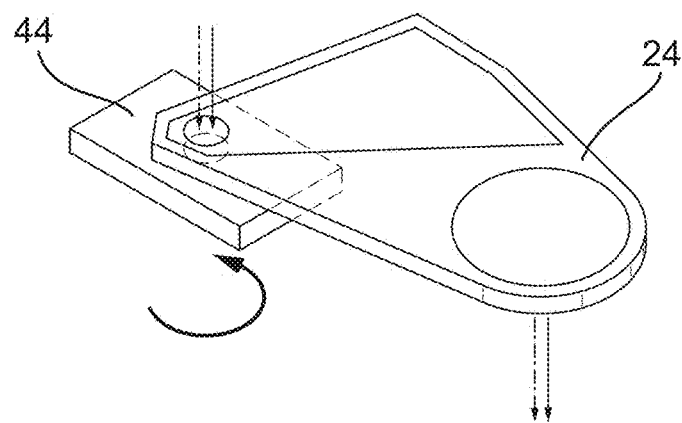
Figure 11H:
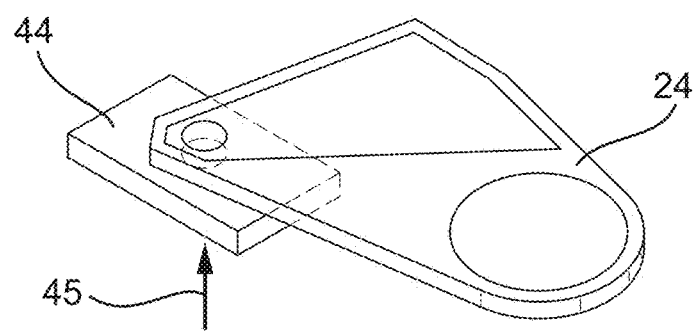
Figure 11I:
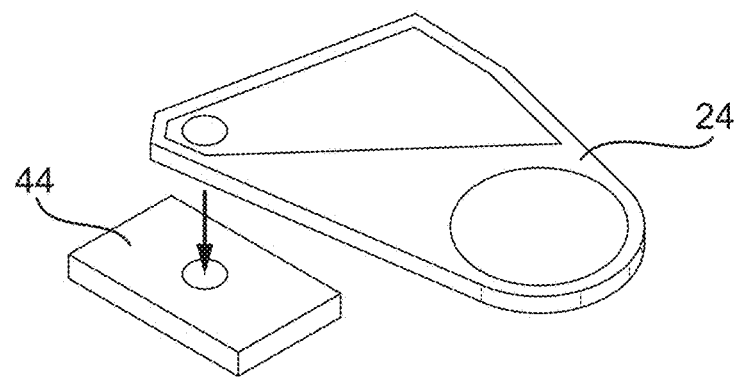

FIGS. 8 and 9 illustrate a further advantage of preferred embodiments of the invention in which the material of the intermediate diffraction grating covers all of those parts of the surface of the optical waveguide part at one side thereof via which the received image-bearing light is guided by total internal reflection from the input diffraction grating to the intermediate diffraction grating. This occurs in the embodiment illustrated in FIG. 3 where the input grating and intermediate grating are continuous (in-plane) on the same one side of the waveguide substrate. This also occurs in the embodiment in FIG. 4 when the input grating is replaced by an input window 26 continuous with the intermediate grating which comprises the same material as the material of the intermediate grating. The input grating in that case is visible on the reverse side of the slab waveguide substrate through the input window.

FIG. 8 shows a side-by-side comparison of a section through the input grating and intermediate grating of a hypothetical comparative waveguide (left-hand image) and a waveguide according to an embodiment of the invention (right-hand image). It can be seen that the effect of producing isolated and discrete input and output diffraction gratings upon the waveguide substrate surface is to present a structural edge to the path of guided light within the waveguide substrate, at which scattering of light can occur. This results in the loss of light which reduces image brightness, and also the contamination of image-bearing light with random scattered light which degrades the output image contrast and resolution. FIG. 9 illustrates this effect in an exploded view of parts of the sectional view of the hypothetical waveguide of FIG. 8.

Because, according to preferred embodiments of the invention in one aspect, the material of the intermediate diffraction grating covers all of those parts of the upper surface of the optical waveguide part at the one side thereof (bearing the intermediate grating and, in a continuum of material, either the material of the input grating or the material of the input window), there is no such scattering edge presented to the guided light passing to the intermediate grating by total internal reflection. Although this technical advantage has been illustrated with reference to a hypothetical device shown in FIG. 8, left hand side, the disadvantages of the structure of the hypothetical device are shared by the prior art devices shown in FIGS. 1A and 1B.

FIGS. 10A to 10D schematically illustrate the manufacturing process by which the waveguide of FIG. 3 may be manufactured. The process begins (FIG. 10A) with the depositing upon a slab optical waveguide substrate 20 a fluid curing glue 11 which is curable to form an optically transparent solid. Two separate, discrete and isolated deposits of curing glue are deposited upon the substrate at locations where it is intended to form two separate diffraction grating regions coupled optically to each other by the waveguide substrate. Next, (FIG. 10B) a grating stamper 30 is introduced to the process. The grating stamper bears upon one surface three surface relief patters (31, 32, 33) each one of which represents a respective one of three surface relief diffraction gratings. Each surface relief pattern of the grating stamper is in negative, or reciprocal, form to the grating it is designed to stamp.

The grating stamper is impressed upon the two discrete deposits of fluid curing glue, in unison, to form an impression upon those two deposits corresponding to a respective one of three diffraction gratings. The three diffraction gratings define an input diffraction grating region defined by a first surface relief pattern 31 of the grating stamper formed wholly within the geographical area, or footprint, of an intermediate diffraction grating region defined by a second surface relief pattern 32 of the grating stamper and a separate output diffraction grating region defined by a third surface relief pattern 33 of the grating stamper. The grating lines/grooves of the input grating are defined by the grating stamper to be non-parallel to those of the intermediate grating so as to diffract input light directly towards and across the main body of the intermediate grating.

Next (FIG. 10C), the fluid curing glue is cured by irradiating it with ultraviolet (UV) radiation 45 with the grating stamper in place. This solidifies the impressed fluid curing glue to solidify the input, intermediate and output diffraction grating impressions.

Finally (FIG. 10D) the stamper is parted from the waveguide substrate to reveal a waveguide of the structure shown in FIG. 3, comprising the solidified input, intermediate and output gratings formed upon the same one surface of the waveguide slab substrate.

It is noted that this process avoids the need to use a reflective edge and, thus, the need to align the diffraction gratings with such an edge before curing the curing glue.

FIGS. 11A to 11I schematically illustrate the manufacturing process by which the waveguide of FIG. 4 may be manufactured. The process begins (FIG. 11A) with the depositing upon a slab optical waveguide substrate 24 a fluid curing glue 11 which is curable to form an optically transparent solid. Two separate, discrete and isolated deposits of curing glue are deposited upon the substrate at locations where it is intended to form two separate diffraction grating regions coupled optically to each other by the waveguide substrate.

Next, (FIG. 11B) a grating stamper 40 is introduced to the process. The grating stamper bears upon one surface two surface relief patters (41, 42) each one of which represents a respective one of two surface relief diffraction gratings. Each surface relief pattern of the grating stamper is in negative, or reciprocal, form to the grating it is designed to stamp.

The grating stamper is impressed upon the two discrete deposits of fluid curing glue, in unison, to form an impression upon those two deposits corresponding to a respective one of two diffraction gratings. The two diffraction gratings define an intermediate diffraction grating region defined by a first surface relief pattern 42 of the grating stamper and a separate output diffraction grating region defined by a second surface relief pattern 41 of the grating stamper. A non-diffractive input window region 43 is also defined by the grating stamper located within and wholly surrounded by the boundary of the first surface relief pattern for the intermediate grating.

Next (FIG. 11C), the fluid curing glue is cured by irradiating it with ultraviolet (UV) radiation 45 with the grating stamper 24 in place. This solidifies the impressed fluid curing glue to solidify the input window, the intermediate grating and output diffraction grating impressions.

In the next manufacturing step (FIG. 11D), the grating stamper is parted from the waveguide substrate to reveal the solidified input window 26, intermediate grating 27 and output grating formed upon the same one surface of the waveguide slab substrate.

Next (FIG. 11E) further deposit of fluid curing glue is then deposited upon the side of the slab optical waveguide substrate 24B reverse to the side 24A upon which the intermediate and output gratings have been formed. The fluid curing glue is deposited at a location where it is intended to form the input diffraction grating in register with, and visible through, the input window 26. An input grating stamper 44 is introduced which bears upon one surface a surface relief pattern 45 which represents a surface relief diffraction grating in negative, or reciprocal, form to the grating it is designed to stamp. The input grating stamper is impressed upon the discrete deposit of fluid curing glue.

Next (FIG. 11F), with the curing glue still in fluid form and the input grating stamper 44 impressed upon it to define the input grating, light of multiple different colours is input into the waveguide through the input window 26. This input light is diffracted by the un-cured input grating pattern into the waveguide substrate 24 towards the intermediate diffraction grating and thence to the output diffraction grating. At the output grating 27, the multi-coloured light is output from the waveguide substrate 24. Any angular misalignment between the directions of output of the light of different colours is observed. Such a misalignment would be due to a misalignment between the diffraction grating lines/grooves of the input grating 44 of the waveguide and the diffraction grating lines/grooves of the intermediate diffraction grating. In effect, the angle at which light is output from the former must be accurately aligned such that light is coupled to the subsequent diffraction gratings optimally.

In order to adjust for such misalignment, the next manufacturing step (FIG. 11G) requires careful rotation of the input grating stamper 44 relative to the waveguide substrate (and its other gratings 25, 27) to re-align the orientation of the grating lines/grooves of the fluid input diffraction grating impression within the fluid curing glue deposit. Optimal alignment is detected when angular alignment of the different colours of output light beams is observed. It is noted that the input grating lines are not parallel to the grating lines/grooves of the intermediate grating at optimal alignment. Accordingly, respective grating vectors have different orientations.

When optimal alignment is observed, the fluid curing glue is subsequently cured (FIG. 11H) by irradiating it with ultraviolet (UV) radiation 45. This solidifies the impressed fluid curing glue to solidify the input diffraction grating impression.

Finally (FIG. 11I), the second grating stamper 45 is parted from the waveguide substrate to reveal a waveguide of the structure shown in FIG. 4, comprising the solidified input window, intermediate grating and output grating formed upon the same one surface of the waveguide slab substrate, and an input grating formed on the other side of the slab substrate and visible through the input window.

It is noted that this process avoids the need to use a reflective edge.

In yet a further embodiment, the step (FIG. 11A) of depositing upon the slab optical waveguide substrate 24 a fluid curing glue 11 may alternatively include depositing the fluid curing glue in such a way that no curing glue is deposited at the intended location of the input window 26 of the intermediate grating 25. As a result, the input window would comprise no curing glue at all—namely, clear and uncovered optical substrate surface region surrounded by intermediate diffraction grating parts, rather than a groove/line-free coating of curing glue as described above.

The embodiments described above are for illustrative purposes and modifications, variants and all equivalents thereto, such as would be readily apparent to the skilled person, are encompassed within the scope of the invention, such as is defined by the claims for example.

The invention claimed is:

1. A waveguide for a display apparatus comprising:
   a planar optical waveguide part for guiding light to be displayed;
   an input diffraction grating arranged to receive light and diffract the received light along the optical waveguide part for guiding thereby;
   an intermediate diffraction grating optically coupled to the input diffraction grating via the optical waveguide part and arranged to receive diffracted light from the input diffraction grating and to expand the received light in a first dimension by diffraction; and
   an output diffraction grating optically coupled to the intermediate diffraction grating via the optical waveguide part and arranged to receive the expanded light and to output the received expanded light from the optical waveguide part by diffraction for display,
   wherein the input diffraction grating is positioned so as to be located wholly within a geographical area bounded by an outer periphery of the intermediate grating, and wherein a grating vector of the input diffraction grating and a grating vector of the intermediate diffraction grating are oriented in different respective directions.

2. The waveguide according to claim 1, in which the input diffraction grating is positioned substantially in-plane with the intermediate diffraction grating such that a physical location of the input diffraction grating is wholly within the geographical area of the intermediate diffraction grating.

3. The waveguide according to claim 1, in which the input diffraction grating is positioned adjacent to the intermediate diffraction grating such that an apparent location of the input diffraction grating is wholly within the geographical area of the intermediate diffraction grating.

4. The waveguide according to claim 1, in which a material of the intermediate diffraction grating covers all of a surface of the optical waveguide part at one side thereof via which said received light is guided by total internal reflection from the input diffraction grating to the intermediate diffraction grating.

5. The waveguide according to claim 1, in which a material of the intermediate diffraction grating is continuous with a material of at least the input diffraction grating.

6. The waveguide according to claim 1, in which a material of the intermediate diffraction grating is continuous with a material of the output diffraction grating.

7. The waveguide according to claim 1, in which the intermediate diffraction grating is a surface relief grating formed in a surface of the waveguide.

8. The waveguide according to claim 1, in which the input diffraction grating and the output diffraction grating are each a relief grating formed in a surface of the waveguide.

9. The waveguide according to claim 4, in which the intermediate diffraction grating comprises a square-wave grating structure.

10. The waveguide according to claim 5, in which at least one of the input grating and the output grating comprises a blazed grating structure.

11. The waveguide according to claim 1, including a coating upon the intermediate diffraction grating, the coating having a refractive index which differs from the refractive index of the material of the intermediate diffraction grating.

12. The waveguide according to claim 1, including a coating upon at least one of the input diffraction grating and the output diffraction grating, the coating having a refractive index which differs from the refractive index of the material of at least one of the input diffraction grating and the output diffraction grating.

13. The waveguide according to claim 1, in which the output diffraction grating is arranged to receive said expanded light from the intermediate diffraction grating and to expand the received light in a second dimension transverse to said first dimension.

14. A display device comprising the waveguide of claim 1.

15. A helmet-mountable head-up display device comprising the waveguide of claim 1.

16. A vehicle display device comprising the waveguide of claim 1.

17. A waveguide for a display apparatus comprising:
a planar optical waveguide part for guiding light to be displayed;
an input diffraction grating arranged to receive light and diffract the received light along the optical waveguide part for guiding thereby;
an intermediate diffraction grating optically coupled to the input diffraction grating via the optical waveguide part and arranged to receive diffracted light from the input diffraction grating and to expand the received light in a first dimension by diffraction; and
an output diffraction grating optically coupled to the intermediate diffraction grating via the optical waveguide part and arranged to receive and expand the received light in a second dimension transverse to said first dimension, and to output the received expanded light from the optical waveguide part by diffraction for display;
wherein the input diffraction grating is positioned relative to the intermediate diffraction grating such that at least one of an apparent location of the input diffraction grating and a physical location of the input diffraction grating is wholly within a geographical area bounded by an outer periphery of the intermediate diffraction grating.

18. The waveguide according to claim 17, wherein a grating vector of the input diffraction grating and a grating vector of the intermediate diffraction grating are oriented in different respective directions.

19. The waveguide according to claim 17, in which a material of the intermediate diffraction grating covers all of a surface of the optical waveguide part at one side thereof via which said received light is guided by total internal reflection from the input diffraction grating to the intermediate diffraction grating.

20. The waveguide according to claim 17, including a coating upon at least one of the input diffraction grating and the output diffraction grating, the coating having a refractive index which differs from the refractive index of a material of at least one of the input diffraction grating, the intermediate diffraction grating, and the output diffraction grating.

* * * * *